United States Patent [19]
Johannesen et al.

[11] 4,418,798
[45] Dec. 6, 1983

[54] DISC BRAKE WITH WEDGE PINS

[75] Inventors: Donald D. Johannesen; Raymond P. Haluda, both of South Bend, Ind.

[73] Assignee: The Bendix Corporation, Southfield, Mich.

[21] Appl. No.: 433,576

[22] Filed: Oct. 12, 1982

Related U.S. Application Data

[63] Continuation of Ser. No. 192,112, Sep. 29, 1980, abandoned.

[51] Int. Cl.³ .............................................. F16D 65/02
[52] U.S. Cl. .............................. 188/73.45; 188/73.35; 403/297; 403/356; 403/374; 403/409
[58] Field of Search ............... 188/73.45, 73.44, 73.35, 188/73.36, 73.37, 73.38, 73.34, 205 A, 205 R, 71.1, 71.8, 251 A, 72.7, 73.31, 73.32, 196 V, 196 P; 192/107, 70.13; 403/374, 409, 356, 297; 308/DIG. 9

[56] References Cited

U.S. PATENT DOCUMENTS

| | | | |
|---|---|---|---|
| 3,425,519 | 2/1969 | Frigger | 188/196 V X |
| 3,436,106 | 4/1969 | Luenberger | 403/356 |
| 3,616,876 | 11/1971 | Brooks | 188/73.45 |
| 3,648,807 | 3/1972 | Lottridge et al. | 188/73.45 |
| 3,862,808 | 1/1975 | Perini | 403/356 X |
| 4,025,213 | 5/1977 | Schäfer et al. | 403/374 X |
| 4,084,665 | 4/1978 | Burnett | 188/73.45 |
| 4,263,361 | 4/1981 | Hodes et al. | 308/DIG. 9 X |
| 4,310,075 | 1/1982 | Johannesen et al. | 188/73.45 |
| 4,318,458 | 3/1982 | Ritsema | 188/73.44 |
| 4,331,221 | 5/1982 | Evans et al. | 188/73.44 |

FOREIGN PATENT DOCUMENTS

| | | |
|---|---|---|
| 2250843 | 4/1974 | Fed. Rep. of Germany . |
| 2252240 | 5/1974 | Fed. Rep. of Germany . |
| 2221647 | 3/1974 | France . |

*Primary Examiner*—Douglas C. Butler
*Attorney, Agent, or Firm*—Paul D. Schoenle; Ken C. Decker

[57] ABSTRACT

A floating-caliper disc brake (1) includes a non-rotating torque member (36) which carries the caliper (22) in fixed radial position relative to the disc (12) via a pair of pins (56, 58). The torque member and caliper each have matching grooves (44, 46, 48, 50) which, when placed in registry, define a pair of apertures (52, 54) between the caliper and the arms (38, 40) of the torque member. The pins are complementary in cross-section to the shape of these apertures so as to space apart the caliper and the torque member when the pins are inserted into the apertures. Brake torque is transferred from the caliper to the torque member solely through the pins. Sliding of the caliper along the pins provides for axial movement of the caliper relative to the torque member and brake rotor, but the caliper is otherwise restrained from movement in the radial and circumferential directions. One of the pins (58) includes a pair of opposed wedge-defining members (66, 68). The wedge-defining members are resiliently biased into engagement with each other to eliminate radial and circumferential clearances between the caliper and torque member. The pins are made from a polymer mixture having physical properties tailored to the needs of disc brakes.

5 Claims, 8 Drawing Figures

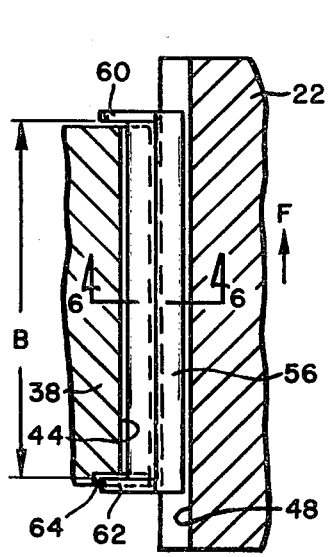
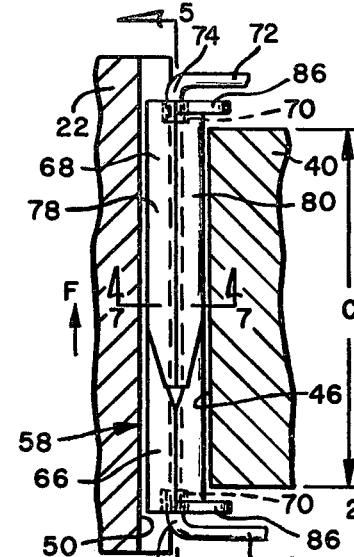
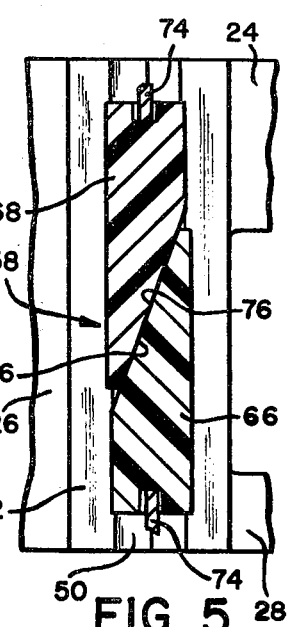
FIG. 3　　FIG. 4　　FIG. 5
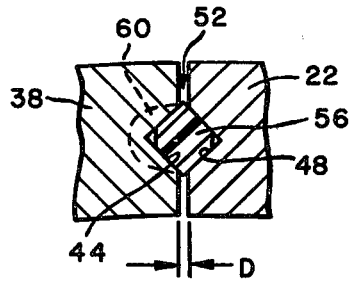
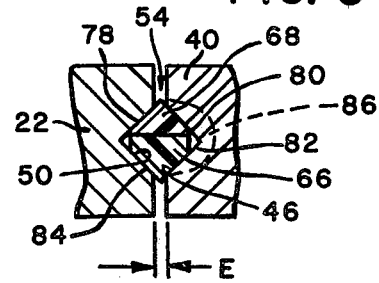
FIG. 6　　FIG. 7
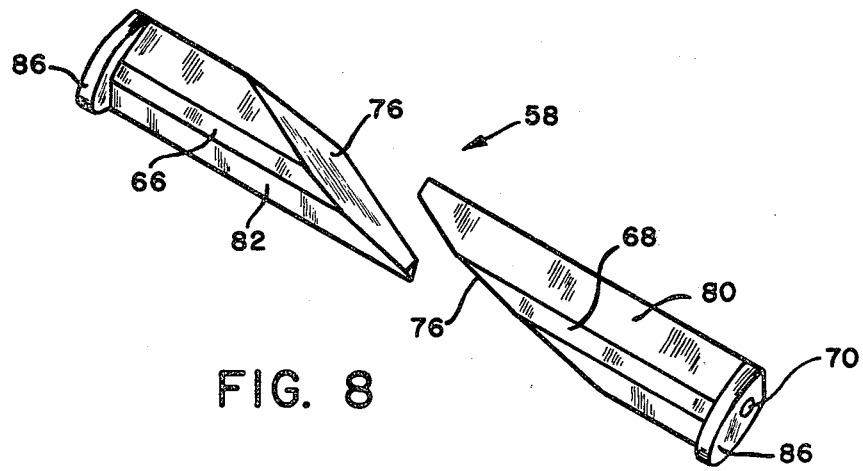
FIG. 8

DISC BRAKE WITH WEDGE PINS

This is a continuation of application Ser. No. 192,112, filed Sept. 29, 1980, and now abandoned.

The invention relates to a floating caliper disc brake.

Floating caliper disc brakes include a rotor having friction faces on opposite sides thereof and a caliper cooperating with a pair of friction elements to urge the pair of friction elements into engagement with the friction faces on the rotor to retard rotation of the rotor when a brake application is effected. A non-rotating torque member carries the caliper in substantially fixed radial and circumferential position relative to the rotor. The caliper is movable, or floats, axially to a limited extent relative to the rotor and torque member.

A disc brake is known in accordance with U.S. Pat. No. 4,084,665 to Burnett in which the torque member includes a pair of circumferentially spaced arms which carry the caliper between them. The caliper and arms both define cooperating abutments which transfer brake torque from the caliper to the torque member. The caliper is restrained from movement relative to the torque member in the radial direction by a pair of pins which are inserted into axially-extending apertures defined between the torque member and caliper. Matching grooves or slots in the torque member and caliper, when placed in registry, define the apertures. Limited axial movement of the caliper relative to the disc is made possible by sliding of the caliper along the pins.

A brake application is effected by a fluid motor carried by the caliper. When the fluid motor is supplied with a pressurized fluid, it forces one of the friction elements against a friction face of the brake disc. Reaction forces acting through the caliper cause the caliper to slide axially relative to the torque member and rotor so that the other friction element is forced against the other friction face of the brake disc.

With a brake of kind illustrated in the Burnett patent, brake torque is transferred from the caliper to the torque member solely by the cooperating abutments of the caliper and torque member arms. Because the abutment surfaces of the caliper and torque member frictionally engage each other, the caliper resists being moved axially by the reaction forces incident to a brake application. Further, corrosion of the abutment surfaces causes additional resistance to axial sliding of the caliper relative to the torque member, with the result that an equal and even application of force to the friction elements is not achieved upon a brake application. In the brake disclosed in the Burnett patent, an attempt has been made to space apart the abutment surfaces in the brake release condition by the use of elastomeric rings on the pins so that corrosion of the abutment surfaces does not interfere with sliding of the caliper. Upon an application of the brake, the resilient elastomeric rings are distorted and the abutment surfaces contact and transfer brake torque to the torque member. However, spacing apart of the abutment surfaces facilitates the entrance of moisture, dirt, and other contamination between the abutments, which contamination promotes corrosion of the abutment surfaces and may accumulate to the point that the caliper is prevented from sliding.

A further consideration with prior disc brakes is that because friction forces inhibit axial movement of the caliper, one of the friction elements may remain in frictional engagement with the brake disc even though the fluid motor is not supplied with a pressurized fluid. Ideally, the runout, or wobble, of the brake disc would serve to space the friction elements from the friction faces of the brake disc. Runout is present in all brake discs due to bearing clearances and imperfections in the disc. Additionally, the bearing clearance allow a slight axial movement of the disc relative to the torque member which carries the caliper. The combination of runout and axial movement of the disc relative to the caliper incident to vehicle operation should position the caliper axially relative to the disc so that the friction elements do not drag on the disc when the brake is not applied. However, because friction prevents the caliper from being readily moved axially relative to the torque member, one of the friction elements may drag on the rotating brake disc. The frictional drag caused on the rotating disc by the dragging friction element causes increased rolling resistance for the vehicle. An increase in vehicle fuel consumption results from the increase in rolling resistance. Additionally, when the vehicle turns a corner, the cornering forces are transmitted from the road to the vehicle chassis through the vehicle suspension. The cornering forces result in the take up bearing clearances and in small distortions of the vehicle suspension structures. Because the disc brake is usually mounted to the vehicle suspension structures, these small distortions and movements result in the brake disc being moved axially relative to the caliper. If friction between the caliper and the torque member resists axial movement of the caliper relative to the torque member, the brake disc is forced against one of the friction elements. Consequently, vehicle rolling resistance is increased during turns. Vehicle tire wear is adversely affected by increased rolling resistance.

The invention as claimed is intended to remedy the drawbacks of prior disc brakes. The design of our invention permits the caliper to move readily in the axial direction because the caliper is supported by a pair of pins which have a low coefficient of friction. The pins are received in axially-extending apertures between the caliper and the arms of the torque member. Cooperating grooves in the caliper and the torque member define the axially-extending apertures. The caliper and the torque member do not directly contact each other. Consequently, braking torque developed by the friction elements and transferred to the caliper during a brake application is transferred to the torque member solely by the pins.

Axial movement of the caliper is accommodated by sliding of the caliper along surfaces defined by the pins. Because the pins are made of a material having a low coefficient of friction, the caliper is movable axially responsive to small axial forces. As a result, the caliper is axially movable responsive to brake disc runout and to suspension structure distortions so that the friction elements do not drag heavily upon the brake disc when the brake is not applied.

Prior floating caliper disc brakes have embodied compromises between the need for ready axial movement of the caliper and the necessity to substantially restrain the caliper from radial and circumferential movement. Because of manufacturing tolerances, prior floating caliper disc brakes have allowed for radial and/or circumferential clearance between the caliper and the torque member. In order to prevent the caliper from rattling against the torque member incident to road shocks and vibrations, the clearance is filled by a resilient member which contacts both the caliper and the torque member. The resilient member compensates for manufacturing tolerances. However, the resilient member causes friction forces which oppose axial movement of the caliper. Our invention avoids the compromises of prior disc brakes by providing a disc brake assembly wherein substantially all radial and circumferential clearances are eliminated.

In order to eliminate clearances from out disc brake assembly, one of the pair of axially-extending pins includes a pair of opposed wedge-defining members. The wedge-defining members are resiliently biased toward one another within their respective aperture between the caliper and the torque membeer. Movement of the wedge-defining members toward one another increases the cross-section of the one axially-extending pin. The other axially-extending pin has an invariant cross-section. Consequently, clearances within the disc brake assembly are taken up by adjustments in the cross-section of the one axially-extending pin, biasing the caliper against the other pin. Despite the elimination of clearances from our brake and the preload on the sliding surfaces which is created by the one axially-extending pin, the caliper is readily movable in the axial direction. The material from which the pins are made provides an inherently low coefficient of friction allowing ready axial movement of the caliper.

A further feature of our invention follows from the material from which the axially-extending pins are made. In addition to providing a low coefficient of friction, the material is inherently corrosion resistant. Consequently, corrosion on the sliding surfaces of the pins is eliminated.

The advantages offered by the invention are mainly that the caliper moves axially relative to the brake disc responsive to small axial forces so that the friction elements do not drag on the brake disc when the brake is not applied; radial and circumferential clearances between the caliper and the torque member are eliminated so that the caliper cannot rattle against the torque member; and the axially-extending pins are made of a material which is inherently corrosion resistant so that the sliding surfaces of the pins remain free of corrosion.

One way of carrying out the invention is described in detail below with reference to drawings which illustrate only one specific embodiment, in which:

FIG. 3 is a fragmentary cross-sectional view taken substantially along line 3—3 of FIG. 1;

FIG. 4 is a fragmentary cross-sectional view taken substantially along line 4—4 of FIG. 1;

FIG. 5 is a fragmentary cross-sectional view taken substantially alone line 5—5 of FIG. 4;

FIG. 6 is a fragmentary cross-sectional view taken substantially along line 6—6 of FIG. 3;

FIG. 7 is a fragmentary cross-sectional view taken substantially along line 7—7 of FIG. 4; and FIG. 8 is a perspective isolation view of the pair of wedge-shaped parts comprising one pin.

Figure 2:
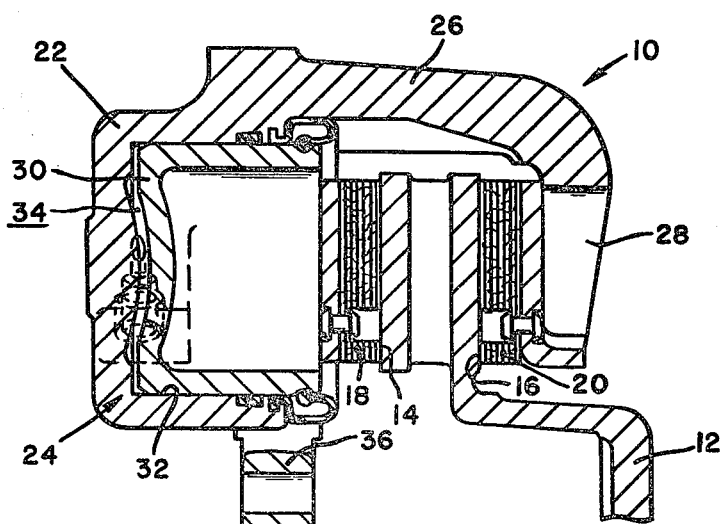
FIG. 2 is a fragmentary cross-sectional view taken substantially along line 2—2 of FIG. 1.

Referring to FIG. 2, a disc brake indicated generally by the numeral 10 includes a rotor 12 rotatable with an axle assembly (not shown) and having a pair of opposed friction faces 14 and 16. A pair of friction elements 18, 20 are disposed adjacent the friction faces 14 and 16, respectively. The friction elements 18 and 20 are urged into braking engagement with their corresponding friction faces 14 and 16 when a brake application is effected. A caliper 22 includes a fluid motor portion 24 disposed adjacent the friction face 14, a bridge portion 26 that traverses the periphery of the rotor 12, and a radially inwardly extending reaction portion 28 which is disposed adjacent the face 16. The fluid motor portion 24 includes a piston 30 slidably arranged in a bore 32 defined within caliper 22. Fluid is communicated to the variable-volume chamber 34 defined between the end of the piston and corresponding end of the bore 32 when a brake application is effected, to urge the piston 30 toward the rotor 12. When the brake is subsequently released, the piston 30 is returned to its brake-release position.

Figure 1:
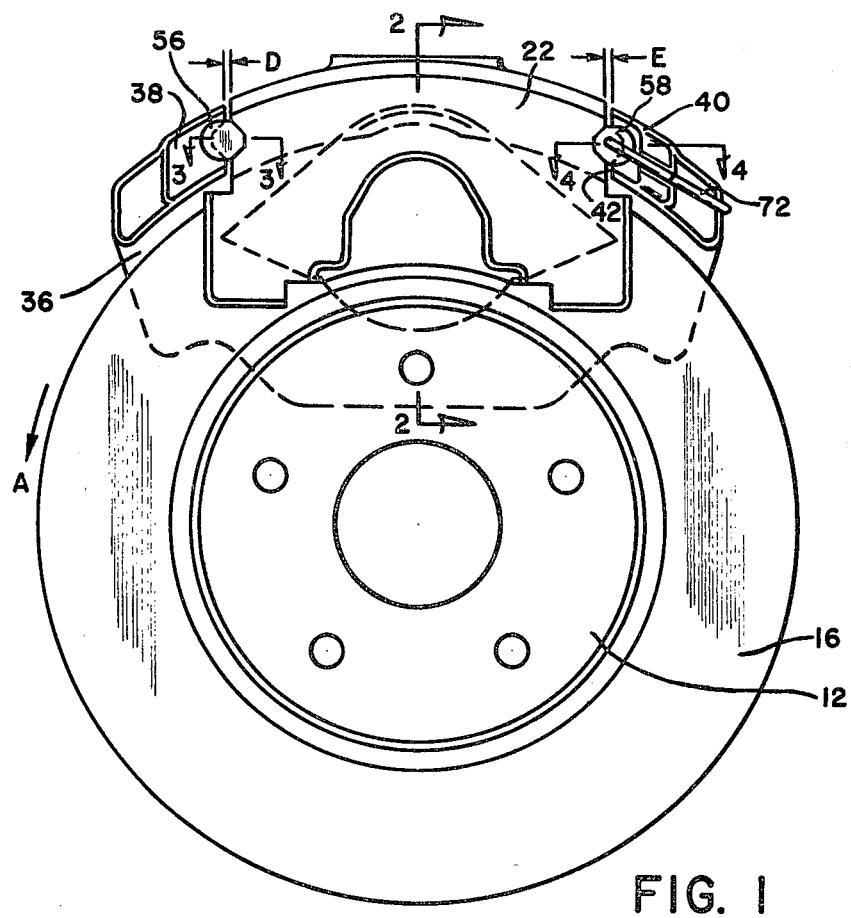
FIG. 1 is a side elevational view of a disc brake made pursuant to the present invention.

Turning to FIG. 1, the caliper 22 is mounted for axial movement with respect to the motor 12 by a torque member 36, which is secured to a non-rotating portion of the axle assembly (not shown). The torque member 36 includes a pair of circumferentially spaced arms 38, 40 that define a recess 42 therebetween.

The caliper 22 is received in the recess 42 between the torque member arms 38 and 40. Viewing FIG. 1, it will be seen that the caliper 22 is spaced from the torque member arm 38 by a clearance D. Likewise, the caliper 22 is spaced from the arm 40 by a clearance E.

Turning now to FIGS. 3, 4, 6, and 7, it will be seen that the torque member arms 38 and 40 and the caliper 22 include matching V-shaped slots or grooves 44, 46, 48, and 50, respectively. Slots 44 and 48, and slots 46 and 50, when placed in registry with each other, define substantially square-shaped apertures 52 and 54, respectively. The apertures 52 and 54 extend axially between the arms 38 and 40 and the caliper 22.

In accordance with the invention; a pair of pins 56 and 58 are received in the apertures 52 and 54, respectively.

Inspection of FIGS. 3 and 6 will show that the pin 56 includes a prismatic center section which is generally square in cross-section. A pair of tabs 60 and 62 extend circumferentially from the ends of the pin 56. Tabs 60 and 62 are spaced apart by a distance B which is less than the axial thickness of the torque member arm 38. Accordingly, the torque member arm 38 is recessed, or cut out, at 64 to accommodate the tab 62. Inspection of FIG. 6 will reveal that the cross-section of the pin 56 substantially coincides with the shape of the aperture 52. The pin 56 in solid and substantially rigid so that the torque member arm 38 and the caliper 22 are spaced apart by the clearance D because of pin 56. The center section of the pin 56 is received in the aperture 52. The tabs 60 and 62 lie adjacent the edges of the torque member arm 38. Consequently, the pin 56 is captive in the aperture 52. The pin 56 can move neither up nor down, viewing FIG. 3, to escpae from the aperture 52.

Similarly, inspection of FIGS. 4, 5, 7, and 8 will reveal that the pin 58 includes a pair of wedge-defining members 66 and 68. The wedge-defining members 66 and 68 are identical and complementary to each other. Members 66 and 68 overlap each other within the aperture 54 so that the members cooperate to define a cross-section which is similar to the cross-section of pin 56. Upon inspection of FIG. 7, it will be seen that the wedge-defining members cooperate to space the caliper 22 and the torque member arm 40. As a result, the caliper 22 and the torque member arm 40 define a clearance E. Turning to FIG. 4, the wedge-defining members 66 and 68 include recesses 70 outside the aperture 54. A C-shaped spring 72 (a portion of which is illustrated in FIG. 4) includes ends 74 which are received in recesses 70. The spring 72 biases the members 66 and 68 toward each other within the aperture 54. Consequently, the wedge-defining members 66 and 68 cooperate with each other at their wedge surfaces 76. Viewing FIGS. 4 and 7, it will be seen that the cross-section defined by pin 58 is variable because of the wedge surfaces 76. Movement of the wedge-defining members 66 and 68 toward each other causes the respective wedge surfaces 76 to slide on each other so that the parallel external surfaces 78, 82 and 80, 84, on the pin 58 move away from each other. In other words, movement of members 66 and 68 toward each other moves surface 78 away from the surface 82 and moves surface 80 away from surface 84, viewing FIG. 7. Consequently, the pin 58 is expansible to eliminate radial and circumferential clearances from the disc brake assembly. The expansible pin 58 biases the caliper 22 to the left, viewing FIGS. 1, 3, 4, 6, and 7, against the pin 56. The clearance E defined between the caliper 22 and the torque member arm 40 is determined by the accumulation of manufacturing tolerances in the torque member 36 and caliper 22.

Turning once again to FIG. 4, it will be noted that the wedge-defining members 66 and 68 include tabs 86, which are similar to the tabs 60 and 62 or pin 56. Tabs 86 serve to limit the axial movement of the pin 58 in the aperture 54. However, the wedge-defining members 66 and 68 are individually removable from the aperture 54. Removal of the spring 72 from the recesses 70 of members 66 and 68 allows the members to be removed from the aperture 54. Consequently, the caliper 22 is removable from the recess 42.

Further inspection of FIGS. 4, 5, 7, and 8 will reveal that the wedge surfaces 76 are perpendicular to an axially-extending, substantially radial plane (a vertical plane in FIG. 7 which is perpendicular to the plane of the figure). Consequently, the wedge-defining members 66 and 68 have equal surface areas in contact with the caliper 22 and with the torque member arm 40. The area of surface 78 on member 68 in contact with the caliper 22 is equal to the area on surface 84 of member 66 which is in contact with the caliper. Similarly, the area on surface 80 of member 68 in contact with the arm 40 is equal to the area on surface 82 of member 66 which is in contact with the arm 40. As a result, axial movement of the caliper 22 creates balanced axial friction forces on each of the members 66 and 68. Because the forces on the component parts on pin 58 (member 66 and 68) are balanced, axial movement of the caliper 22 (vertical in FIG. 4) does not cause the pin 58 to loosen nor to expand in the aperture 54. Expansion of the pin 58 in aperture 54 responsive to axial movement of the caliper could lock the caliper to the torque member, thereby preventing proper brake operation.

According to our invention, the pins 56 and 58 are made of polyphenylene sulfide resin. This resin is inherently corrosion resistant so that the sliding surfaces of the brake remain free of corrosion throughout the service life of the brake. Tests of disc brakes made according to our invention have shown that the pins possess adequate mechanical strength when they are fabricated from polyphenylene sulfide resin reinforced with from less than 30 weight percent of 40 weight percent or more of glass fibres. However, when reinforced with glass fibres, the resin has rather poor qualities as a bearing material. The wedge surfaces 76 of the pin 58 have been found to gall unless careful attention is paid to lubrication. Further testing has shown that pins fabricated from polyphenylene sulfide resin reinforced with approximately 30 weight percent of glass fibres and with about 15 weight percent of polytetrafluoroethylene (commonly known as TFE TEFLON) as a lubricant, avoid the galling problem on the surfaces 76. Of course, the pins 56 and 58 could be made from a metal. For example, stainless steel could be used to make the pins.

Preferably, our disc brake is used with forward vehicle motion corresponding to rotation of the brake disc in the direction of arrow A, viewing FIG. 1. In this way, torque from forward vehicle braking is transferred from the caliper 22 to the torque member 36 via the solid pin 56. Inspection of FIGS. 3 and 4 will reveal that the distance B between the tabs 60 and 62 of pin 56 is less than the thickness C of the torque member arms 38 and 40. The arm 38 is cut out at 64 to allow the pin 56 to be received in the aperture 52. However, the arm 40 does not have a cutout 64. Consequently, the pin 56 cannot be installed in place of pin 58. Misassembly of the brake with the pin 58 in aperture 52 is thereby prevented.

When a brake application is effected, high pressure fluid is admitted into the variable volume chamber 34 where it urges the piston 30 toward the friction face 14, thereby urging the friction element 18 into frictional engagement with the friction face 14. As is well known in the art, reaction forces acting through bridge 26 and the reaction portion 28 of the caliper 22 will also urge the friction element 20 into frictional engagement with the friction face 16 to brake or retard the rotation of the rotor 12.

Viewing FIGS. 3 and 4, the reaction forces acting through bridge 26 move the caliper 22 in the direction indicated by the arrow F when a brake application is effected. Torque developed by friction elements 18, 20 during a brake application and transferred to caliper 22 is transferred from the caliper to pins 56 and 58 and hence the torque member 36. Consequently, our invention provides for ready axial movement of the caliper 22 relative to the torque member 36 by sliding of the caliper on a surface defined on a relatively small and inexpensive part. The pins 56 and 58 may be made of a material which is inherently corrosion resistant. Additionally, the pin 58 provides for the elimination of radial and circumferential clearances from the disc brake assembly. Consequently, the caliper cannot rattle against the torque member responsive to vehicle shocks and vibrations.

We claim:

1. A disc brake comprising a rotor having friction faces on opposite sides thereof and rotatable about an axis perpendicular to the plane of said rotor, a caliper cooperating with a pair of friction elements to urge the latter into engagement with the friction faces on the rotor to retard rotation of said rotor, a non-rotating torque member carrying said caliper in a substantially fixed radial and circumferential position relative to said rotor, said caliper and said torque member having axially-extending grooves in registry, said grooves cooperating to define an axially-extending aperture between said caliper and said torque member, an elongated pin slidably received in said axially-extending aperture for the purpose of movably supporting said caliper relative to said torque member, said pin substantially coinciding in shape to said axially-extending aperture, resilient means engaging said pin for moving said pin within said axially-extending aperture, characterized in that said pin includes a pair of wedge-defining members which slidably engage each other at a wedge surface on each member, said resilient means moving said wedge-defining members relative to each other so as to wedge the members together between said caliper and said torque member in order to accommodate manufacturing tolerances between said caliper and said torque member.

2. The invention of claim 1 wherein said axially extending grooves are V-shaped whereby said axially-extending aperture is rectangular in cross-section, said elongated pin including a prismatic portion slidably received in said aperture, said prismatic portion substantially coinciding in cross-section to said aperture; characterized in that said wedge surfaces of said wedge-defining members are substantially perpendicular to an axially-extending, substantially radial plane; said axial plane being defined by vertexes of said prismatic portion.

3. The invention of claim 1 wherein said caliper and said torque member include axially-extending grooves in registry defining a second axially-extending aperture, a second elongated pin slidably received in said second aperture, said second pin substantially coinciding in cross-section to the cross-section of said second aperture, characterized in that said second pin includes a pair of circumferentially-extending tabs which extend from opposite ends of said second pin, said tabs engaging said torque member so that said pin is substantially prevented from axial movement relative to said torque member.

4. A disc brake comprising:
a brake disc having a pair of friction elements on opposite sides thereof;
a non-rotatable torque member having a pair of circumferentially spaced arms defining a recess therebetween, said torque member arms including a pair of axially-extending V-shaped grooves disposed adjacent said recess;
a caliper received in said recess and straddling the periphery of said brake disc; said caliper cooperating with a pair of friction elements to force the friction elements into engagement with said brake disc upon a brake application, thereby retarding rotation of said brake disc; said caliper defining a pair of V-shaped grooves confronting a pair of V-shaped grooves in said torque member, said V-shaped grooves cooperating to define a pair of axially-extending apertures between said caliper and said torque member;
a first elongated pin slidably received in one of said axially-extending apertures, said pin including an elongated prismatic portion substantially coinciding in cross-section to said aperture, said pin including a pair of tabs extending circumferentially from opposite ends of said pin, the axial distance between said tabs being less than the axial thickness of the contiguous torque member arm, said contiguous member arm defining a recess receiving one of said tabs;
a second elongated pin slidably received in the other of said axially-extending apertures; said second pin including a pair of opposed, elongated wedge members; said wedge members overlapping each other within said other aperture and slidably engaging at wedge surfaces of each wedge member, said wedge members cooperating to define a cross-section substantially coinciding to said other aperture, said wedge members being movable relative to one another to wedge said caliper toward said first elongated pin in order to accommodate any circumferential clearances between said spaced arms; said pins and said caliper; and
means for moving said wedge members relative to one another.

5. A disc brake comprising:
a rotor having friction faces on opposite sides thereof and rotatable about an axis perpendicular to the plane of said rotor;
a caliper cooperating with a pair of friction elements to urge the pair of friction elements into engagement with the friction faces on the rotor to retard rotation of said rotor;
a non-rotating torque member including a pair of circumferentially spaced arms which define a recess therebetween, said caliper being received in said recess, one of said torque member arms having an axially-extending groove in registry with a corresponding axially-extending groove in said caliper, said grooves cooperating to define an aperture between said caliper and said torque member; and
a pair of wedge-defining members slidably received in said aperture and engaging said caliper and said torque member in order to accommodate any circumferential clearance between said caliper and said one torque member arm, said wedge-defining members overlapping each other within said aperture and engaging each other at wedge surfaces of each member, said caliper and said torque member defining substantially equal contact areas with each of said wedge-defining members and said wedge surfaces being movable in an axial direction relative to each other to change a circumferential dimension for said pair of wedge-defining members in a circumferential direction at the overlap therebetween.

* * * * *